United States Patent Office 3,336,592
Patented Aug. 15, 1967

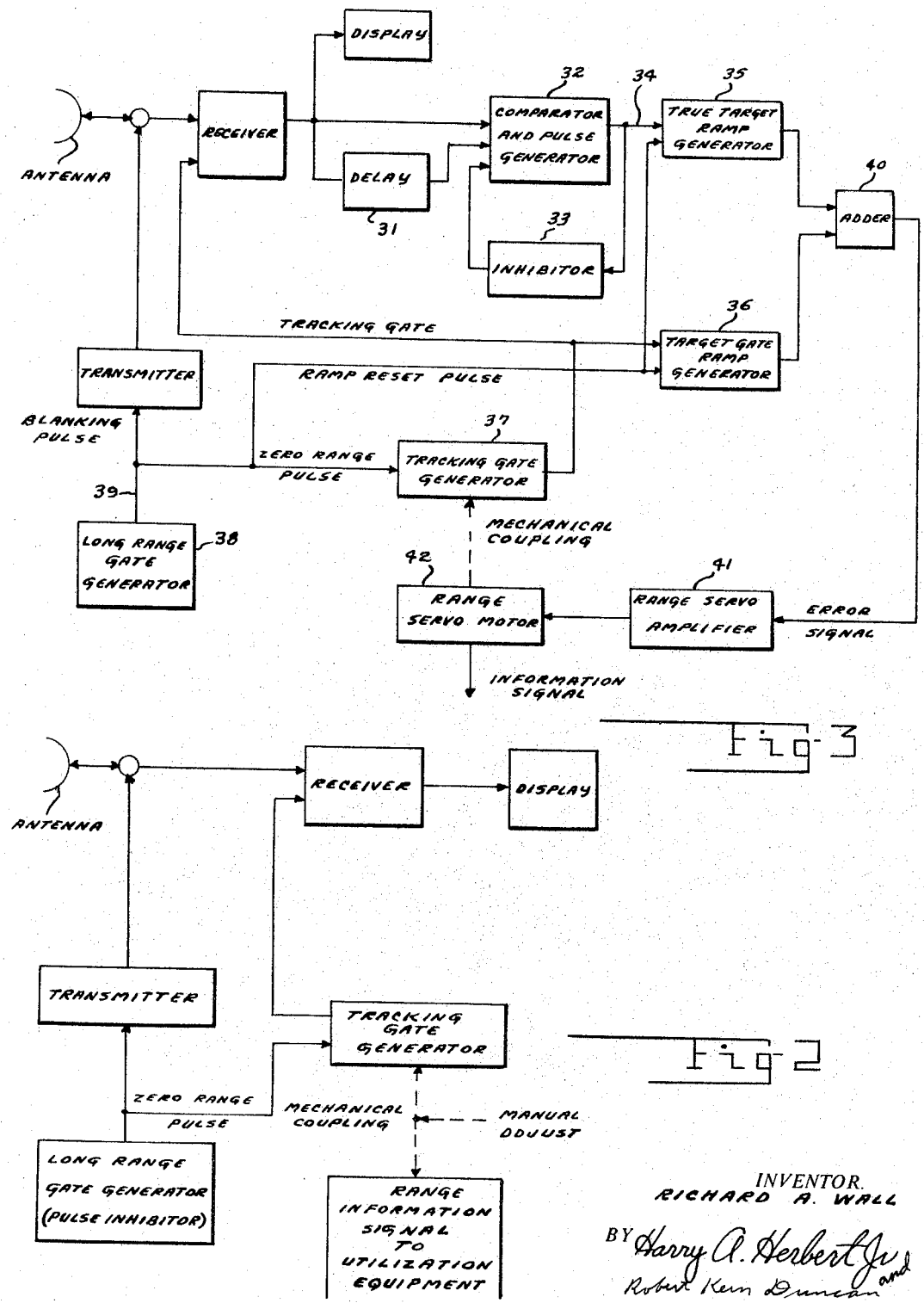

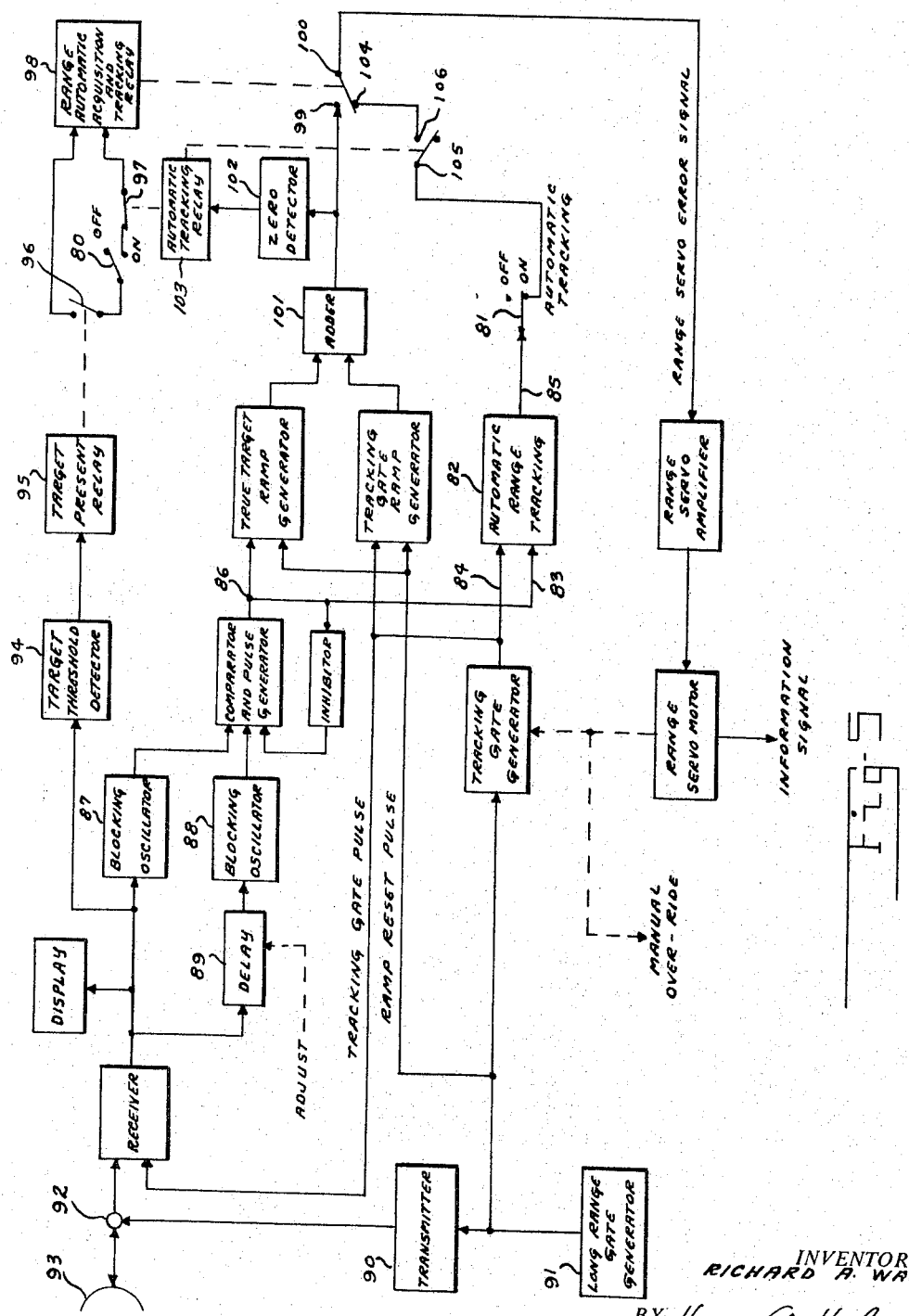

3,336,592
LONG RANGE AUTOMATIC RANGE ACQUISITION AND TRACKING RADAR
Richard A. Wall, Sunnyvale, Calif., assignor, by mesne assignments, to the United States of America as represented by the Secretary of the Air Force
Filed Aug. 12, 1966, Ser. No. 572,163
5 Claims. (Cl. 343—7.3)

This invention relates to long range tracking radars. More specifically it relates to blanking pulse type long range tracking radars, particularly useful for satellite tracking.

Acquisition of satellites by tracking radars has been a difficult operation, especially, when the problem of determining correct range has been added. It has involved a highly skilled operator who has had long and precise training with expensive simulators. Thus, automatic range acquisition is a very desirable feature for satellite tracking radars. When a satellite is first launched, orbit injection errors frequently cause rather large errors in predicted acquisition range, time, and angle for the first few orbits. Range acquisition is particularly difficult because of high range rates (sometimes in excess of 25,000 feet per second), uncertainty of acquisition time and range, and the typically high pulse repetition rate of 400 to 600 or more pulses per second that result in ambiguous target returns. When the multiple target returns first appear on the range displays the operator loses valuable time identifying the true target and slewing the tracking gate to this position with quite frequently a significant loss of data resulting.

It is therefore an object of this invention to provide a long range radar system that has automatic range acquisition and tracking.

It is another object of the present invention to provide an automatic range acquisition and tracking long range radar apparatus that greatly reduces the skill level required of the radar operator.

Another object of the present invention is to provide an automatic target acquisition long range radar system that achieves target acquisition more expediently than generally is possible with conventional manual acquisition radar systems.

These and other objects will be more fully understood from the following detailed description considered with the drawing wherein:

FIG. 2 is a simplified block diagram of a conventional long range blanking pulse radar system;

FIG. 3 is a simplified block diagram of a representative automatic range acquisition and tracking radar system;

FIG. 5 is a more detailed block diagram of a representative automatic range acquisition and tracking radar system.

Figure 1:
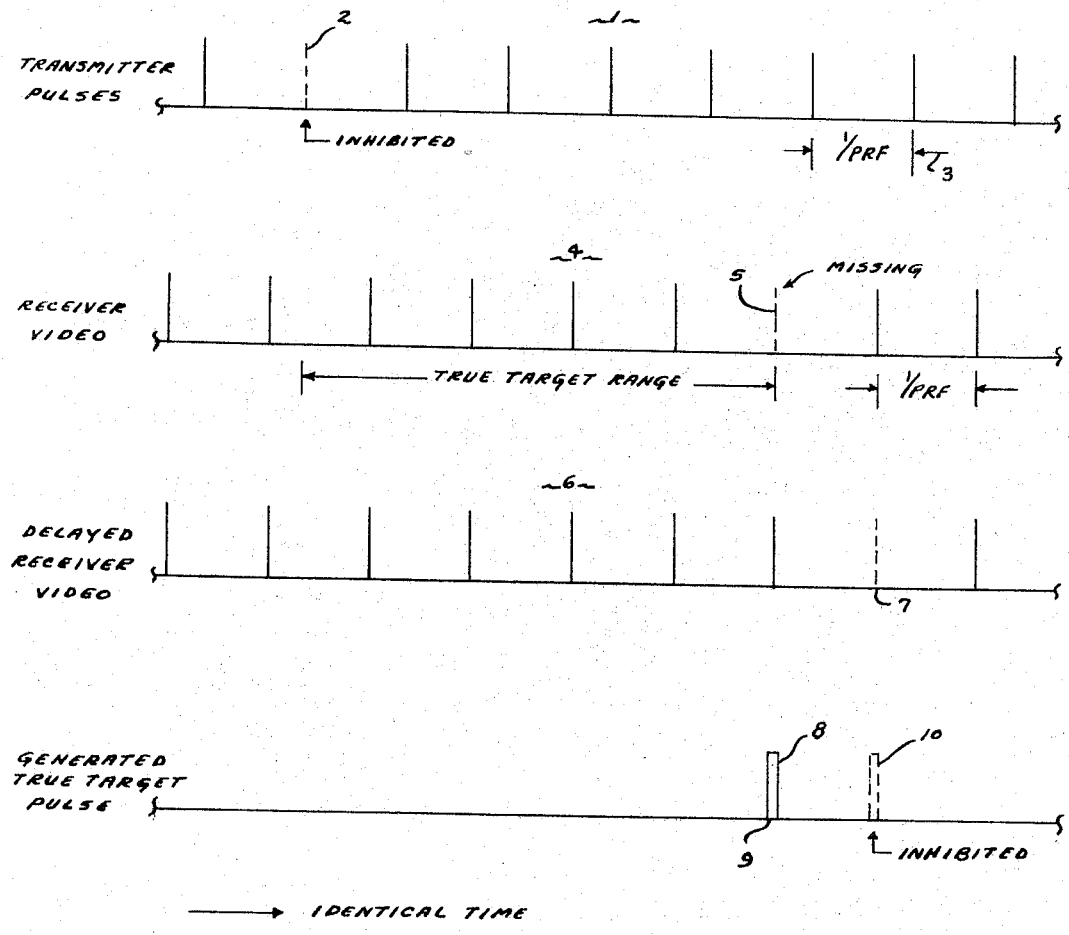
FIG. 1 is an illustrative pictorial representation of the pulse-time-range relationships.

Referring to FIG. 1 a conventional long range blanking pulse radar transmitter output consists of a train of pulses 1, one of which, 2, is periodically inhibited by a long range gate generator to provide a reference for long range measurement. Such an inhibited pulse does not get transmitted and results in a blank or a pulse omission where one would normally occur, as is represented by the dotted line 2. The pulse repetition frequency (PRF) is determined by the circuitry built into the transmitter, and provides a pulse time spacing 3 equal to one over the PRF. A representative, illustrative receiver output when a target is present is shown 4, and consists of a similar train of (echo) pulses containing a missing pulse 5 at the true target range as represented on the time and range scale of the receiver output display. The display unit which is conventionally an oscilloscope, synchronized with the transmitted pulses, shows the operator the transmitted pulses, the received echoes, i.e., plots 1 and 4, and a range marker pulse. The radar operator then manually positions the range marker, or tracking gate, in coincidence with the target, as represented by the missing pulse, and proceeds to track the target by maintaining coincidence. A block diagram of this system is shown in FIG. 2.

The foregoing paragraph is a brief description of the current state of the art. The following will be a description of this invention setting forth the combination of apparatus cooperating with the apparatus of a long range blanking pulse radar to provide a long range automatic range acquisition and tracking radar.

By use of conventional delay means, the signals from the receiver are delayed one pulse repetition interval as shown, 6, in the illustrative pulse-time-range example of FIG. 1, and at 31 of FIG. 3. This places the missing pulse at 7 (FIG. 1) on the time scale, one 1/PRF later. By conventional means the delayed and the undelayed outputs of the receiver are compared and by further conventional means a pulse is generated by a comparator and pulse generator 32, FIG. 3, whenever simultaneous pulses are not present. This results in a pulse 8 generated at time 9 and of course normally another pulse 10 would be generated one 1/PRF later due to the missing pulse at 7. By using a short term inhibitor 33, FIG. 3, cooperating with the pulse generator, the pulse generator is inhibited for a short time after the first pulse, thus preventing a pulse 10 being generated. Generated pulse 8 thus occurs at true target range as represented by the time interval between the inhibited transmitter pulse and the generated pulse.

The generated true target pulse on line 34 (FIG. 3) triggers the true target ramp generator 35. This generator generates a voltage ramp commencing at the time of the true target pulse. The ramp increases with time to the maximum range of the radar which is normally at the occurrence of the next blanked transmitter pulse. Another similar ramp generator 36 having the same ramp characteristics, except of opposite polarity, is triggered by the receiver tracking gate generator 37. The two ramp outputs increase linearly with time but in opposite (polarity) directions until reset (returned to zero range time) by the gate pulse from the long range gate generator 38. It is to be observed that the pulse on line 39 from the long range gate generator 38 determines zero range time by blanking or inhibiting the transmitter; also it terminates the ramp generators 35 and 36, and resets them to zero range time; and is the zero range timing pulse for the receiving tracking gate generator 37.

Figure 4:
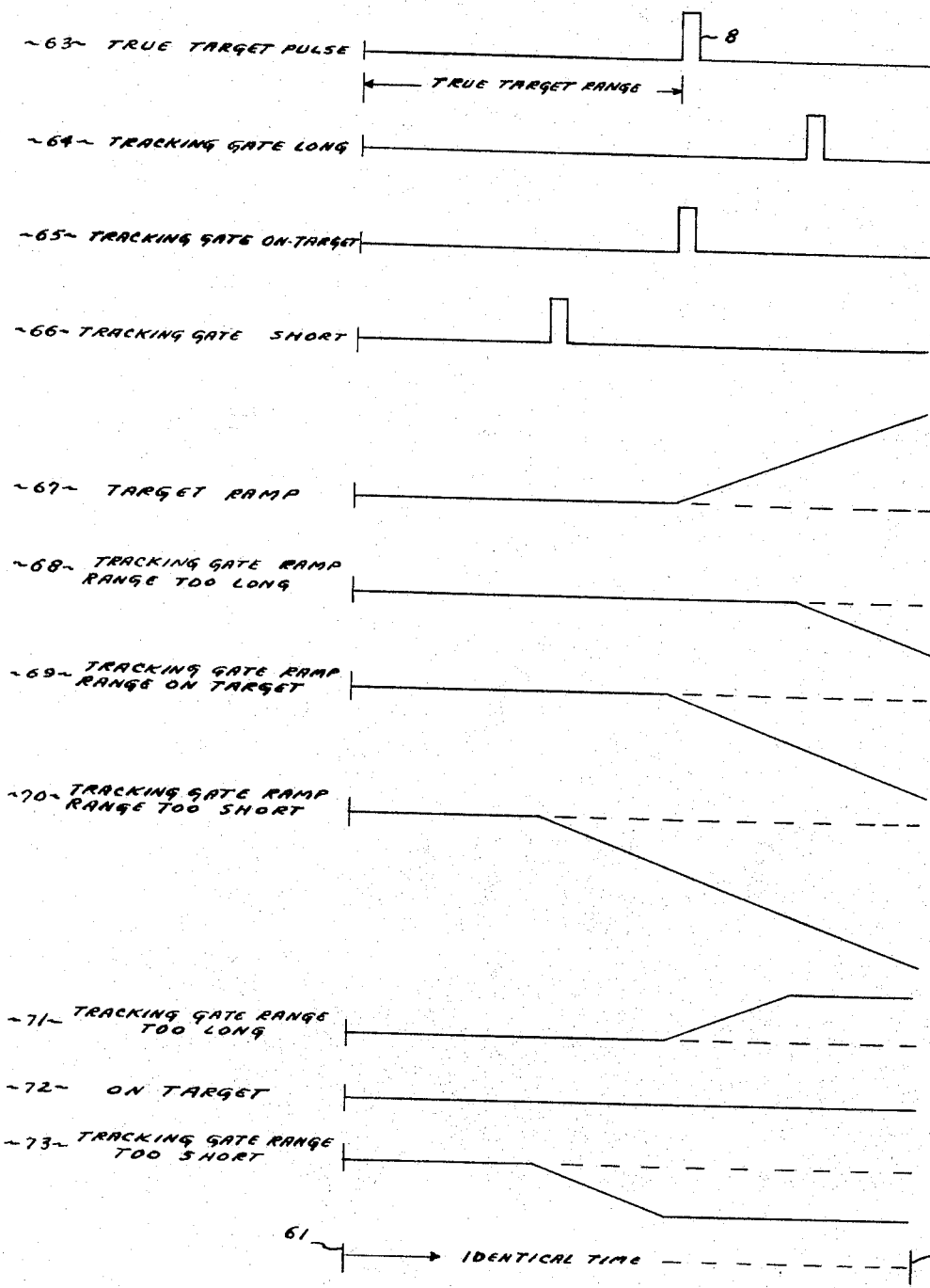
FIG. 4 is an illustrative pictorial representation of time and range gate relationships.

The functioning of the circuitry represented by FIG. 3 may more readily be understood by the time sequence shown in FIG. 4. It is to be understood that range is measured by elapsed time, thus range and time are directly related and the same abscissa may be used to represent both. In FIG. 4 zero range (and time) for all the sequence of events occurs at 61 the time of the inhibited transmitter pulse as represented at 2 of FIG. 1. The next inhibited transmitted pulse occurs at 62, terminating the range sweep of the system and reinitiating another range-time interval.

The true target pulse 8 of range-time plot 63 is a representation of the same representative pulse 8 of FIG. 1. Plot 64 represents a typical condition where the tracking gate is positioned long (longer in range, later in time) with respect to the target. Plot 65 represents a tracking gate in time coincidence with the target, and plot 66 represents a condition where the tracking gate is shorter in range than the target. The true target ramp generator 35 (FIG. 3) starts generating a voltage ramp at target time as shown by plot 67 (FIG. 4). In the illustrative example being described the ramp is shown as going positive in polarity. It may be either positive or negative, the requirements being that the polarity be opposite to the target gate ramp generator 36, and that the rates of the generated ramps be identical. In this embodiment the polarity of the true target ramp generator is made positive and the target gate ramp generator is made negative. Plot 68 depicts the ramp generated for the target gate of plot 64. Likewise plot 69 depicts the ramp for the on target gate condition represented by plot 65, and plot 70 depicts the ramp for the "short" tracking gate of plot 66. It is to be realized that at the reception of a target the range tracking gate, per chance, will either be positioned short of, longer than, or in coincidence with the target.

The output voltages of ramp generators 35 and 36 are added in the adding circuit represented by block 40 (FIG. 3). The resulting voltage sum from the adder produces the error signals as shown in FIG. 4 by plots 71, 72, and 73 for their respective tracking gate target relationships. This error signal may be amplified as necessary by the range servo amplifier 41 and used to control the range servomotor 42 which is mechanically coupled to the tracking gate generator 37 and activates the positioning of the tracking gate. The receiver tracking gate generator is thus driven to move the receiver tracking gate in the direction for coincidence of the tracking gate with the true target pulse so as to reduce the error signal to zero, the direction of movement being determined by the polarity of the error signal. If the target is moving the system will automatically track the target with the tracking gate pulse within the limitations of the time constants of the sysem. It is to be observed that the polarity of the error signal depends on which ramp generator was triggered first, determined by whether the tracking gate is short or long with respect to the target, and that the voltage magnitude of the error signal depends on the range error existing between the tracking gate and the target, and, of course, the rates of the ramps. It has generally been found desirable to incorporate a smoothing circuit at the input of the range servo amplifier to improve the system stability.

FIG. 5 is a block diagram of a slightly more detailed and refined embodiment of the invention. Well known circuitry has been included in the apparatus to provide a system that is smoother in operation, less susceptible to instability, and more flexible in operation. Provision for completely manual operation, wherein the operator observes the target on the display unit, manually moves the tracking gate to coincidence, and thereafter manually tracks the target, is available by placing switches 80 and 81 in the off position. The apparatus then reverts to the prior art system of FIG. 2.

It has been mentioned that the system embodiment of FIG. 3 will track a moving target within limitations. Exceedingly accurate tracking systems have been developed in the prior art for maintaining two pulses in coincidence, such as a conventional radar echo pulse and a tracking gate pulse, once coincidence has been effectively achieved. Such a system is represented, 82, in FIG. 5. (The tracking gate may be a split gate pulse, i.e., an early and a late gate.) The generated true target signal pulse on line 83 and the tracking gate pulse on line 84 produce a highly accurate range tracking error signal on line 85 by well-known conventional means 82.

If it is desired to automatically achieve target acquisition, but to manually track the target, switch 81 is placed in the "off" position and the operator then tracks the target by the visual display. It may sometime be desirable to utilize another display means such as an oscilloscope connected at point 86. A display at this point will show only the target (the generated true target pulse) and the tracking gate.

Blocking oscillator pulse generators 87 and 88 are shown in the embodiment of FIG. 5. They are identical, and their use insures that both sets of pulses fed to the comparator have the same amplitudes and pulse widths. Their use has generally been found to be desirable. Such use for generating a "standard" pulse is conventional. Delay 89 is manually adjustable so that a delay of 1 PRF may be maintained as small changes in components take place with ageing and environmental changes.

In order to further understand the operation of the embodiment of FIG. 5 a typical sequence of operation will now be set forth. The conventional long range radar transmitter 90 and long range gate generator 91 are transmitting a train of pulses as shown in FIG. 1. These pulses pass through the conventional T-R device 92 and are radiated by conventional radar antenna 93. The pulse train is periodically inhibited by the long range gate generator to provide a reference. A target is present, therefore, the receiver output contains a train of pulses, as shown at 4, FIG. 1, with one periodically missing. If no target were present there would be essentially no signal output from the receiver. It will be assumed that automatic range acquisition is desired and that automatic tracking by conventional means is also desired. Thus switches 80 and 81 are placed in the "on" position. Target threshold detector 94 activates the "target present" relay 95 due to the presence of sufficient target echoes of sufficient amplitude being present in the receiver output. Relay 95 closes relay contacts 96. Contacts 97 are normally closed, thus range automatic acquisition and tracking relay 98 is energized closing relay contacts 99 and 100. (The excitation voltage for the relay is not shown. It is in series with the activation contacts.)

Target acquisition is accomplished as previously explained by the summation signal of the ramp generators providing an acquisition error signal that actuates the servomotor coupled to the tracking gate generator to control the tracking gate generator to move the tracking gate into coincidence with the generated true target pulse. As the tracking gate approaches the true target pulse the output from the adder 101 approaches zero. When coincidence is effectively established the zero detector 102 activates the automatic tracking relay 103 opening the contacts 97. This de-energizes relay 98, opens contacts 99 and 100 and closes contacts 100 and 104. When the automatic tracking relay 103 opens contacts 97 it also closes contacts 105 and 106. This condition is maintained as long as target and gate coincidence is maintained. (The output of the adder remaining at essentially zero.) The conventional automatic range tracking circuit 82 now is in control and furnishes the tracking error signal to the range servo amplifier. If automatic acquisition is desired with manual tracking by an operator, disabling switch 81 is placed in the "off" position disabling the automatic range tracking. The operator then "sees" the target and the tracking gate in coincidence (this being achieved automatically and nearly instaneously with the return echoes of a target) and proceeds to manually track the target.

While certain illustrative embodiments of this invention have been described in some detail, it is obvious that numerous changes may be made without departing from the general principles and scope of the invention.

What is claimed is:
1. In a blanking pulse type long range radar system having receiving means, and target tracking gate means, the improvement for providing automatic target acquisition comprising: delay means cooperating with the said receiving means for providing a delayed signal; comparator means cooperating with the said receiving means and the said delay means for providing a generated true target pulse; a first voltage ramp generating means responsive to the said comparator means for generating a first voltage ramp; a second voltage ramp generating means responsive to the said target tracking gate means for generating a second voltage ramp of opposite polarity to said first volt- age ramp; adding means cooperating with the said first ramp generating means and the said second ramp generating means to provide an error signal; and means responsive to the said error signal cooperating with the said target tracking means for positioning the said tracking means whereby the target tracking gate is positioned in approximate coincidence with the said generated true target pulse.

2. The improvement in a blanking pulse type long range radar having pulse transmitting means transmitting pulses at a pulse repetition frequency, blanking pulse means for periodically inhibiting the said transmitting means whereby periodically a pulse is omitted, receiving means providing a received signal from a radar target, and target tracking gate means providing a target tracking gate, the said improvement providing automatic target acquisition and automatic range tracking comprising: signal delay means having a delay of one over the said pulse repetition frequency cooperating with the said receiving means for providing a delayed received signal; comparator and pulse generating means cooperating with the said receiving means and the said signal delay means for providing a generated true target pulse; short term inhibiting means cooperating with the said comparator and pulse generating means inhibiting the said comparator and pulse generating means for a short term after the generation of the said true target pulse; a first voltage ramp generating means responsive to the said comparator and pulse generating means for generating a first voltage ramp; a second voltage ramp generating means responsive to the said target tracking gate means for generating a second voltage ramp of opposite polarity to the said first voltage ramp; voltage adding means cooperating with the said first voltage ramp generating means and the said second voltage ramp generating means for providing an acquisition error signal; automatic range tracking means responsive to the said generated true target pulse and the said target tracking gate for providing a tracking error signal; control means responsive to an error signal for activating the said target tracking gate means; zero voltage detecting means responsive to the said acquisition error signal for providing an output when the said acquisition error signal approaches essentially zero voltage; and switching means responsive to the said output of the zero detecting means cooperating with the said adding means, the said automatic range tracking means, and the said control means whereby the said control means is responsive to the said acquisition error signal during target acquisition and the said control means is responsive to the said tracking error signal during target tracking.

3. The combination as claimed in claim 2 wherein the rates of the ramps of the said first and second voltage ramp generators are identical.

4. The combination as claimed in claim 3 wherein the said blanking pulse type long range radar has display means and the improvement in addition comprises disabling switch means cooperating with the automatic range tracking means for disabling the said automatic range tracking means whereby the said received target is manually tracked.

5. The combination as claimed in claim 4 wherein the said control means responsive to an error signal, provides an information signal output.

No references cited.

RODNEY D. BENNETT, *Primary Examiner.*

T. H. TUBBESING, *Assistant Examiner.*